May 29, 1923.
G. A. BEHLEN
1,456,614
AUTOMATIC RECORD TRANSFERRING MECHANISM FOR PHONOGRAPHS
Filed Sept. 21, 1921   8 Sheets—Sheet 4
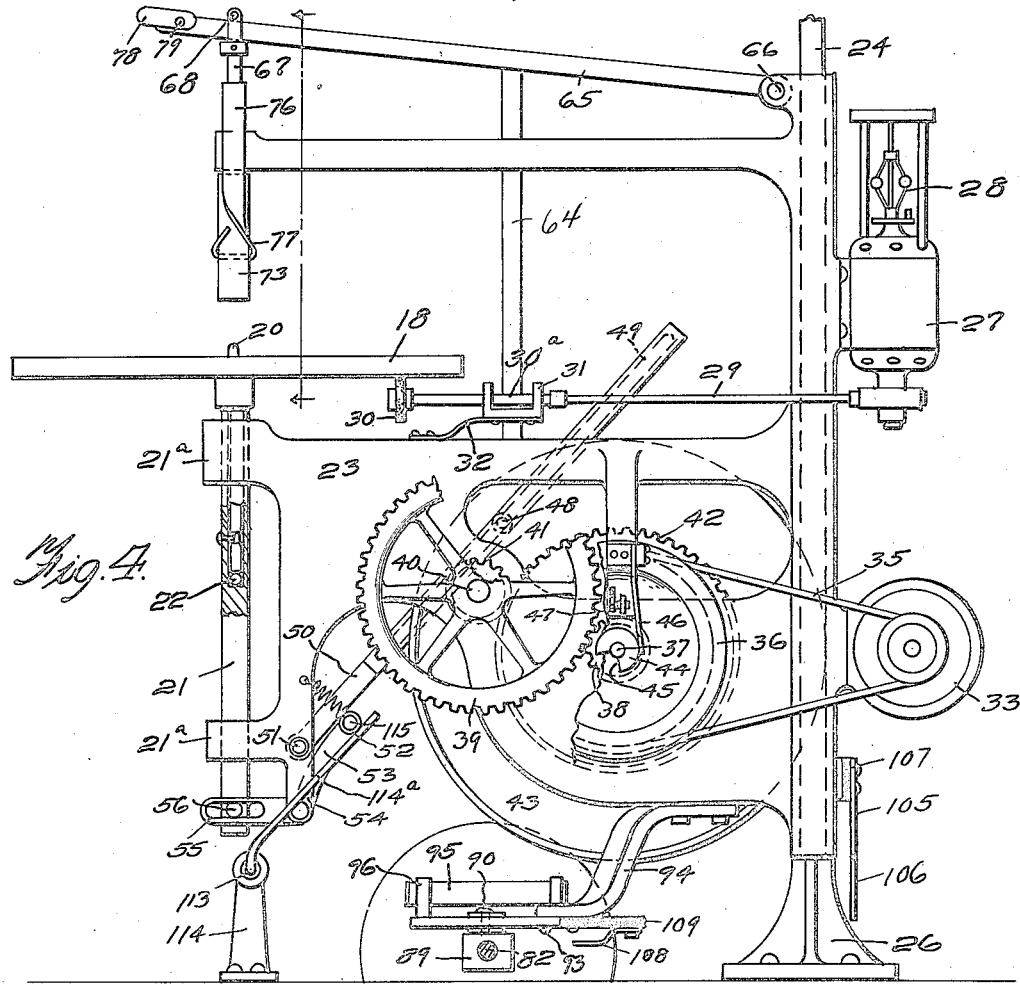
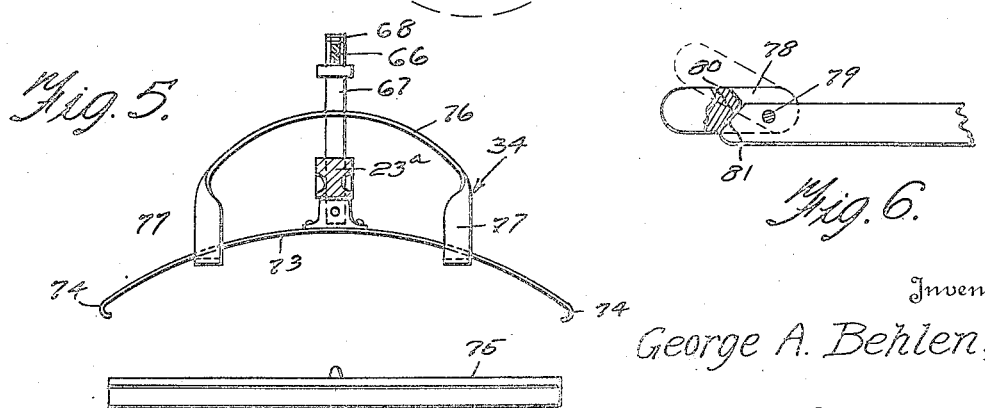
Inventor
George A. Behlen,
By Shepherd N Campbell
Attorney

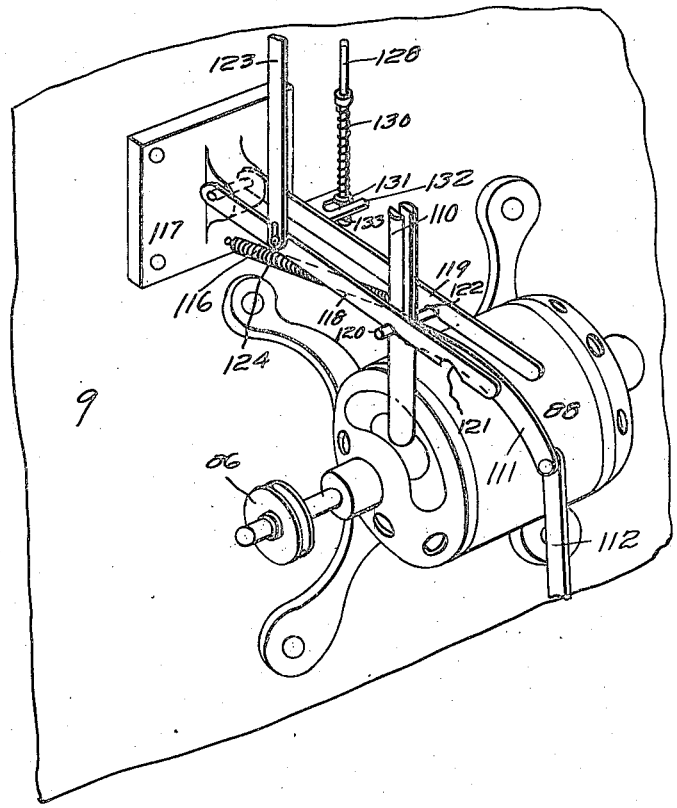
Fig. 7
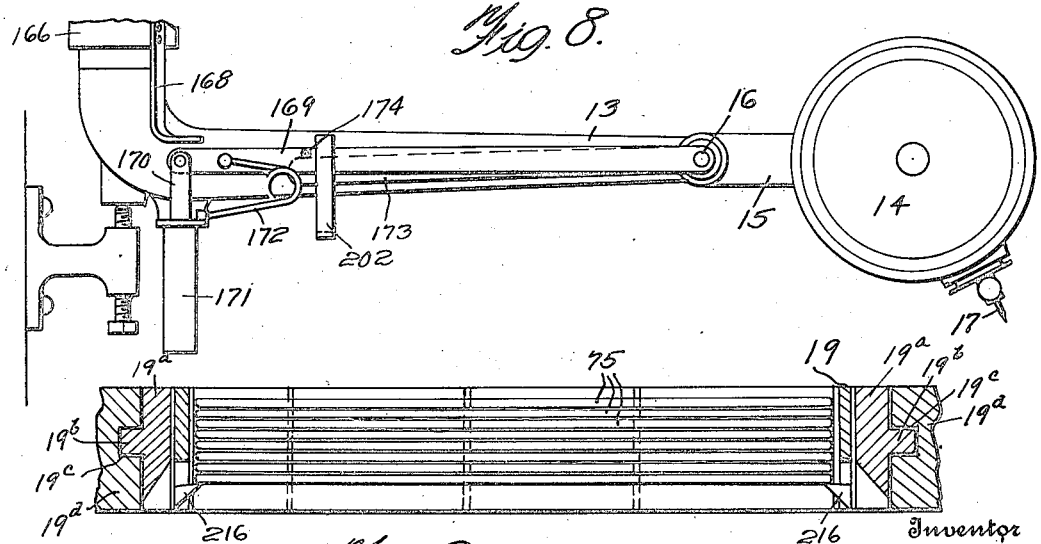
Fig. 8
Fig. 9
George A. Behlen,

May 29, 1923.

G. A. BEHLEN 1,456,614

AUTOMATIC RECORD TRANSFERRING MECHANISM FOR PHONOGRAPHS

Filed Sept. 21, 1921

Inventor

George A. Behlen,

By Shepherd Campbell

His Attorneys

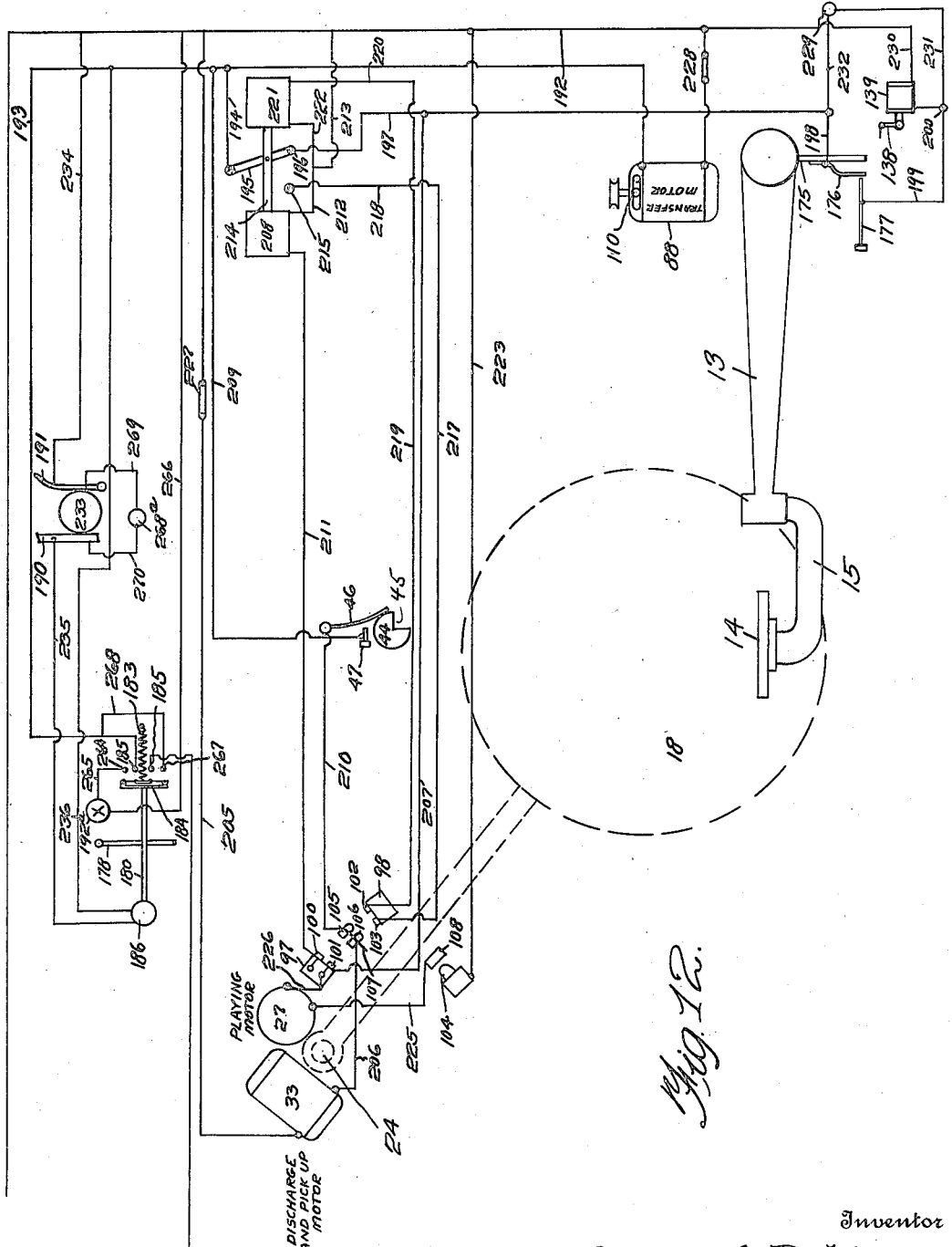

Patented May 29, 1923.

1,456,614

UNITED STATES PATENT OFFICE.

GEORGE A. BEHLEN, OF GREENVILLE, SOUTH CAROLINA, ASSIGNOR OF ONE-HALF TO C. C. RUSH, OF GREENVILLE, SOUTH CAROLINA.

AUTOMATIC RECORD-TRANSFERRING MECHANISM FOR PHONOGRAPHS.

Application filed September 21, 1921. Serial No. 502,166.

*To all whom it may concern:*

Be it known that I, GEORGE A. BEHLEN, a citizen of the United States, residing at Greenville, in the county of Greenville and State of South Carolina, have invented certain new and useful Improvements in an Automatic Record-Transferring Mechanism for Phonographs, of which the following is a specification, reference being had therein to the accompanying drawings.

This invention relates to an automatic record transferring mechanism for phonographs and it has for its object to provide a simple and reliable mechanism whereby a plurality of records may be placed in a magazine and the machine set in motion, the machine without further attention playing the records in succession, and if desired over and over again indefinitely.

The invention contemplates the provision of mechanism whereby the machine may be coin controlled, or manually controlled from a distant point. Furthermore, means are provided whereby the playing of any record may be interrupted and such record returned to the magazine and another substituted, whenever desired.

Further objects and advantages of the invention will be set forth in the detailed description which follows;

In the accompanying drawings:

Fig. 4 is a detail view of the table carrying frame and the operating mechanism therefor looking from the opposite side of said frame from that illustrated in Fig. 2;

Fig. 5 is a detail of the record gripping device;

Fig. 6 is a detail of a yieldable finger hereafter described;

Fig. 7 is a perspective view of the transfer motor and associated parts;

Fig. 8 is a side view of the tone arm and sound box;

Fig. 9 is a sectional view through the magazine;

Fig. 12 is a diagrammatic view illustrating the electrical connections to the various parts.

Figure 2:
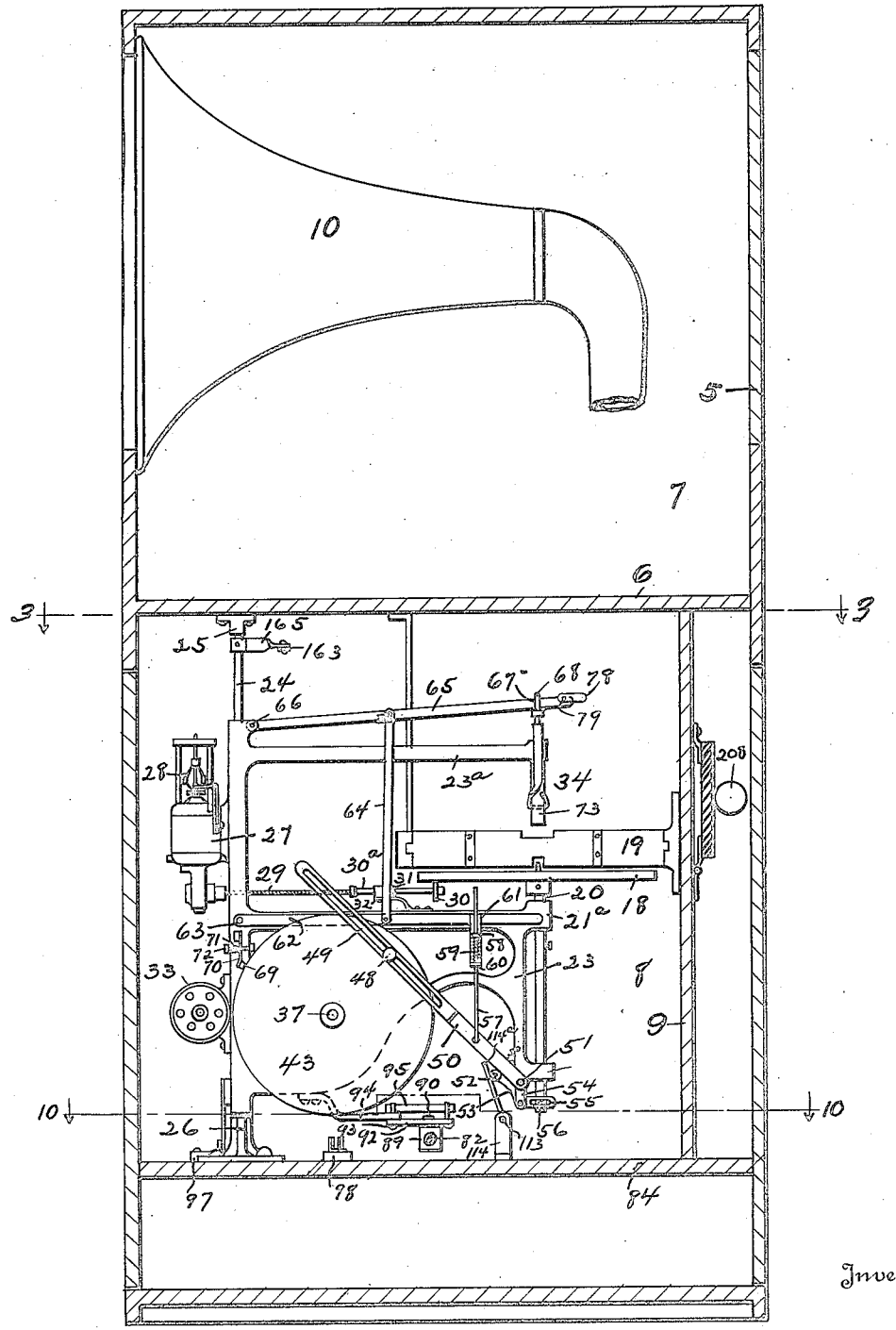
Fig. 2 is a vertical sectional view but looking toward the opposite side of the casing from that illustrated in Fig. 1.
Figure 3:
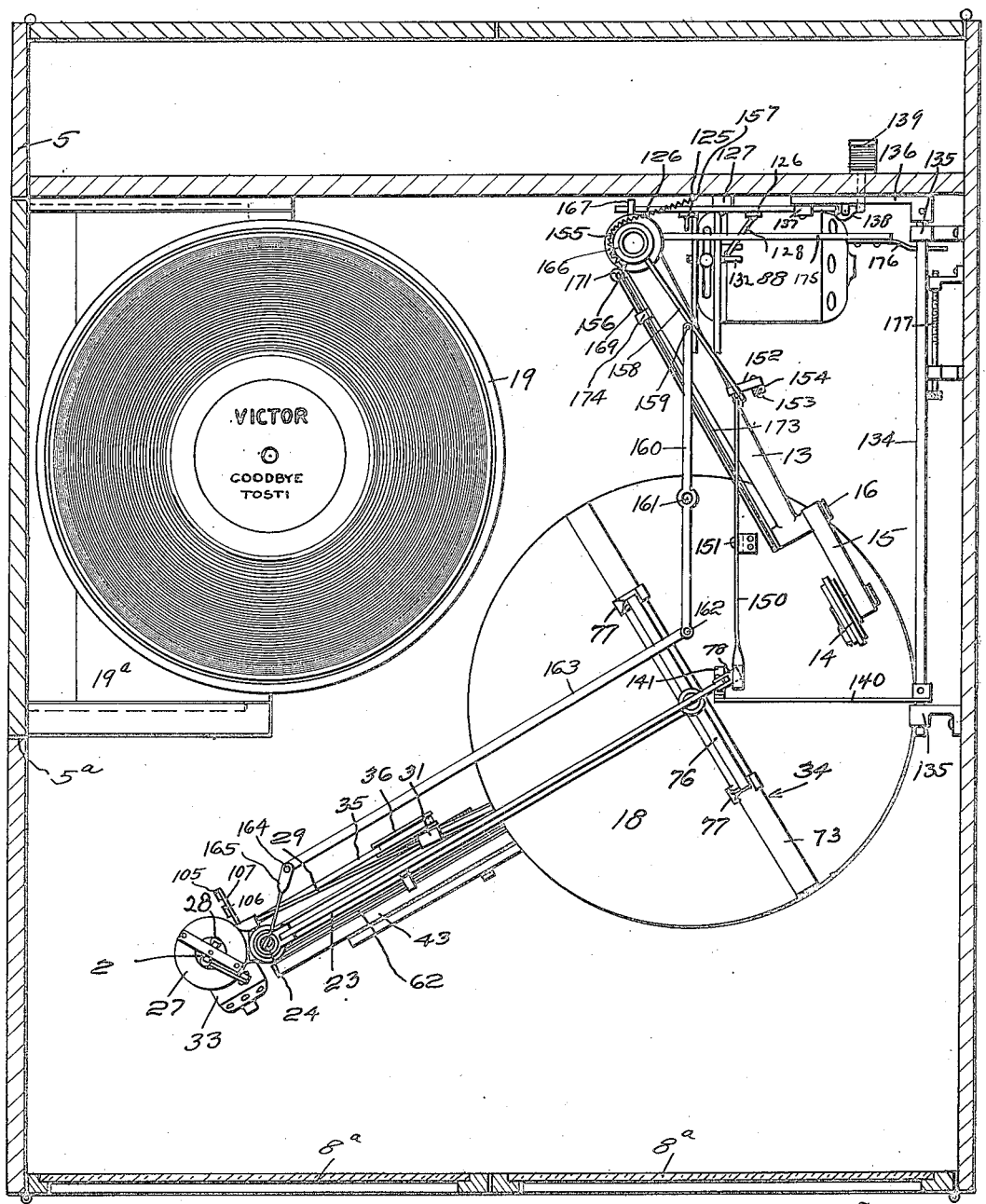
Fig. 3 is a horizontal sectional view upon line 3—3 of Fig. 2 with certain of the parts omitted and showing the turntable swung to playing position.
Figure 10:
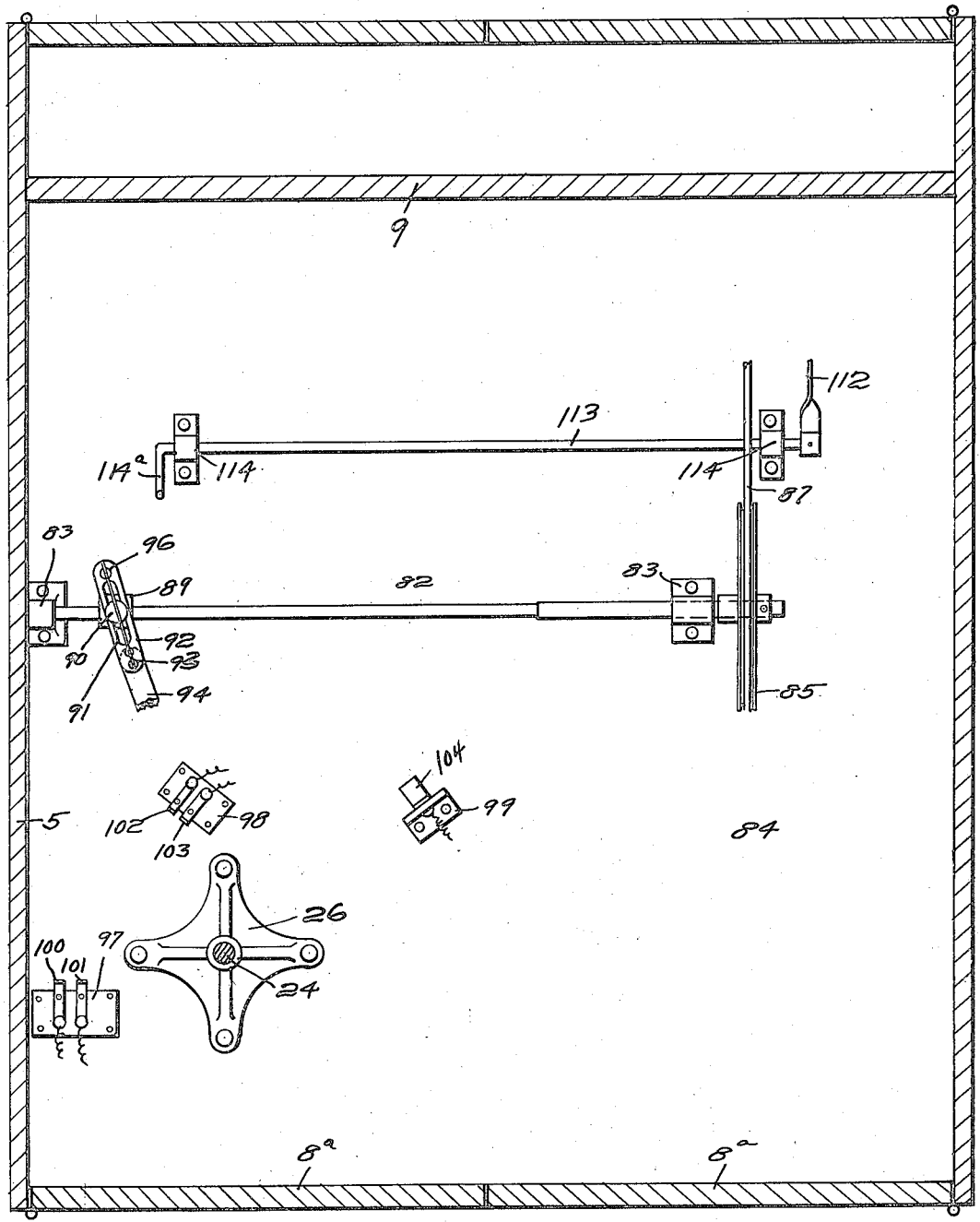
Fig. 10 is a horizontal section on line 10—10 of Fig. 2.

In the drawings 5 designates the case of the machine. While I have illustrated a conventional type of case, it is to be understood that the invention contemplates the use of cases of varying sizes, shapes and finishes. The particular case chosen for purposes of illustration is divided by a transverse horizontal partition 6 into an upper compartment 7 and a lower compartment 8. The lower compartment 8 is in turn divided by a transverse vertical partition 9 into a front and rear portion. A horn or other sound amplifying device 10 has its shank 11 connected to the horizontal partition 6 and the upper tabular end 12 of a tone arm 13 projects into the lower end of the shank of said horn and is capable of turning movement therein. A sound box 14 is connected by a tubular member 15 with the tone arm 13, the connection between the tone arm 13 and the tubular member 15 being a pivotal one, as indicated at 16, so that the sound box 14 may be rocked upwardly to free it of the record, without rendering it necessary to lift the tone arm. The needle 17 of the sound box engages in the usual way with a record tablet upon a turntable 18. The turntable 18 is mounted upon a swinging frame which swings said turntable from playing position, as illustrated in Fig. 3 to record transferring position, as illustrated in Fig. 2, at which latter time the turntable is caused to travel beneath a ring-like magazine or record holder 19. The turntable is fixed upon a vertical shaft 20 and this shaft is mounted in a nonrotative and vertically slidable shaft 21. The lower end of the shaft 20 preferably rests upon a ball 22 in the shaft 21, to provide an antifriction mounting for the lower end of the shaft 20. The shaft 21 is journaled in bearings 21ª of the swinging frame 23 referred to and this frame is in turn carried by a vertical shaft 24 which is journaled in upper and lower bearings 25 and 26. Thus the frame 23 and the parts carried thereby are mounted to swing about the vertical shaft 24 and from the position illustrated in Fig. 2 to the position illustrated in Fig. 3, and vice versa. An electric motor 27 which will hereinafter be referred to as the playing motor because it constitutes the drive for the turntable 18 is mounted upon and moves bodily with the frame 23. This motor is provided with a governor 28 of the usual and well known construction by which its speed may be adjusted. The motor 27 drives through a flexible shaft 29 to a friction disc 30 which is adapted to engage the under side of the turntable 18 to impart rotation to said turntable. The flexible shaft 29 is connected to a rigid section of shaft $30^a$ and this rigid section of shaft is mounted in a yielding bearing 31. This bearing is rendered yielding by reason of the fact that it is supported upon the free end of a spring 32, carried by the frame 23. The arrangement described is a highly advantageous one because it renders the disc 30 yielding so that the table 18 may raise and lower, as hereinafter set forth, and will, when brought to its lowermost position, make firm contact with the disc 30 without shock or jar. A motor 33, hereinafter referred to as the discharge and pick up motor, (because it moves the turntable 18 bodily vertically to force the record upon said turntable upwardly beneath a pile of records in the magazine 19 where it is engaged and held by a detent, and causes a record grip 34 to pick up the topmost record) is mounted upon and moves bodily with the frame 23. This motor drives by a belt 35 to a pulley 36 that is loose upon a shaft 37. A pinion 38 which is fixed to the pulley 36 meshes with a gear wheel 39, the shaft 40 of which carries a pinion 41 which meshes with a gear wheel 42 that is fast upon the shaft 37. The shaft 37 also carries a disc 43. Thus it will be seen that the connections described constitute a reducing gearing between the motor and shaft 37 and that the disc 43 and the shaft 37 both turn at the same rate of speed. The shaft 37 carries a circuit controlling cam 44 having a cutaway portion 45 which at one point in the revolution of the cam permits a spring finger 46 to move inwardly enough to establish electrical communication between a contact screw 47 and spring finger 46. The action of this cam 44 insures, among other things, that the disc 43 will make but a single revolution at each of the limits of travel of the frame 23, the purpose of which will be presently set forth. The disc 43 carries a stud 48 which travels in a slot 49 formed in a lever 50, the latter being pivoted at 51 to a part of the frame 23. The lower edge of the lever 50 bears upon an anti-friction roller 52 carried by a bell crank lever 53, the latter being pivoted at its heel to a depending arm 54 of the frame 23. The other arm of the bell crank lever is slotted, as indicated at 55 and engages a pin 56 upon the lower end of the shaft 21. Thus as the disc 43 makes a revolution, the lever 50 is swung downwardly and rocks the bell crank lever 53 and forces the shaft 21 and turntable 18 upwardly. As the lever 50 returns to its original position as the disc 43 completes its revolution, the table 18 will be returned to lowered position. A rod 57, the lower end of which is pivotally connected to the lever 50, carries a collar 58 which bears upon a spring 59 and this spring in turn bears upon the foot 60 of a bracket 61 that is carried by a horizontal lever 62, said lever being pivoted at 63 to the frame 23. The lever 62 is connected by a link 64 with a substantially horizontal lever 65 the rear end of which is pivoted at 66 to the frame 23. The forward portion of the lever 65 passes through a slot formed in a vertical stem 67 and a pin passes through this stem above the lever, as indicated at 68. Thus it will be seen that in the rotation of the disc 43 and the consequent depression of the lever 50, the lever 65 will be forced downwardly through the connections described and that this movement of the lever 65 is a yielding one by reason of the presence of the yielding connections provided by the spring 59 and associated parts. In order to prevent any possibility of overrunning of the disc 43 and to insure that it will return to the same position after each revolution, I may, if desired, provide a brake consisting of a brake shoe 69 carried by a yielding finger 70 and adjusted by means of a spring 71 and nut 72.

The stem 67 is the stem of the gripping device 34. This stem 67 slides through the upper horizontal arm $23^a$ of the frame 23 and carries at its lower end a spring steel strip 73, the outer ends of which are bent to hook formation, as indicated at 74, to adapt them to engage over the edges of the record tablets indicated at 75. A yoke 76 has the depending loop arms 77 through which the strip 73 passes. Under initial downward movement of the stem 67, the yoke and stem 73 all move together, but when the central portion of the yoke 76 strikes upon the upper portion of the arm $23^a$ then the yoke is held against further downward movement, but the stem 67 continues to descend and thus forces the central part of the strip 73 downwardly, while its outer portions are held against downward movement by the loops 77. This results in flattening the strip 73 or in reducing its concavity and causes the hooks 74 to release the record as hereinafter set forth. The free end of the lever 65 carries a finger 78 which will yield upwardly but will not yield downwardly. This finger is bifurcated to straddle the outer end of the lever and is secured to said outer end by its pivot pin 79, said finger and the outer end of the lever are provided with confronting surfaces 80 and 81 of such shape as to prevent downward movement of the finger but to permit upward movement of the finger.

The necessary swinging movement is imparted to the frame 23 from a screw shaft 82 which is mounted in bearings 83 upon a horizontal lower partition 84 of the case. Motion is imparted to this shaft by means of pulleys 85 and 86 and belt 87 from a transfer motor 88 (so called because it swings the frame 23 to transfer the record and table 18 from record discharging position to playing position). A traveling nut 89 on the screw shaft 82 carries a stud 90 which travels in a slot 91 formed in a link 92. This link is pivotally connected at 93 to a rigid arm 94 of the frame 23. However the link 92 is not free to swing unrestrainedly upon its pivot 93 but upon the contrary is restrained in its movement by a leaf spring 95 one end of which is engaged with a fixed stud upon the arm 94 and the other end of which is engaged with a stud 96 that is rigid with the link. Thus the link is capable of a certain yielding with respect to the arm 94 due to the flexibility of the spring but, upon the other had, tends to move with said arm or to cause said arm to move with it. It is manifest that if the screw 82 be rotated in one direction, the frame 23 will be swung accordingly and that if the screw 82 be rotated in the opposite direction the frame 23 will be moved in the opposite direction. The horizontal partition 84 has contact blocks 97, 98 and 99 mounted thereon, the block 97 carrying the contact strips 100, 101, the block 98 carrying the contact strips 102, 103 and the block 95 carrying a contact piece 104. A pair of contact fingers 105, 106 are mounted upon a laterally extending arm 107 of the frame 23 and the lower ends of these fingers 105, 106 travel between the contact point 100, 101 and 102, 103 in the swinging movement of the frame 23 making contact with the first named pair of contact strips when at one limit of movement of said frame and making contact with the other pair of contact strips at the other limit of movement of the frame. At the limit of movement of the frame 23 to playing position, a contact finger 108 supported by an insulating block 109 from the under side of the arm 94 makes contact with the contact strip 104 for a purpose hereinafter set forth.

Figure 1:
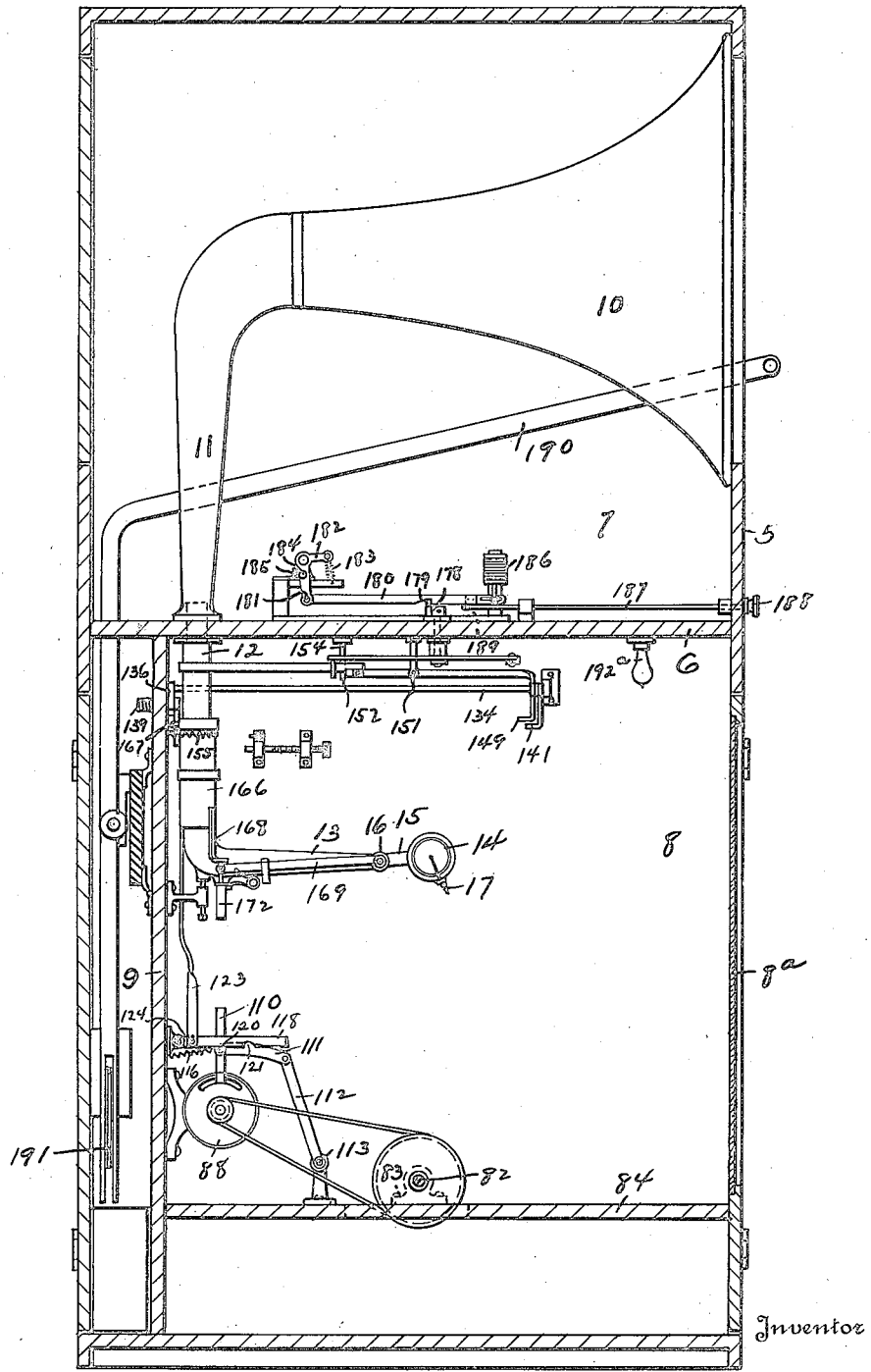
Fig. 1 is a vertical sectional view from front to rear of the machine.

The motor 88, see Figs. 1 and 7 is a reversible motor and 110 designates the reversing arm of said motor. When this arm is swung to its limit of movement forwardly, the motor is caused to rotate in one direction and when said arm is swung to its limit of movement rearwardly, the motor is caused to rotate in the opposite direction and when the arm stands upright or in neutral position, the motor is stopped. The shifting of the reversing arm 110 is effected by a link 111 and crank arm 112 from a transverse shaft 113 that is supported in bearings 114 on the lower partition 84. That end of the shaft 113 remote from the motor 88 is provided with a crank arm 114ª which lies in the path of movement of a transversely extending pin 115 that is carried by the upper arm of the bell crank lever 53, when the frame 23 has been swung to record discharging position beneath the magazine 19.

A spring 116, see Fig. 7, is attached at one end to the arm 110 and at its rear end to a block 117 that is secured to the partition 9 of the cabinet. This spring tends to move the arm 110 to rearmost position, in which position the motor is caused to rotate in such direction as to cause the frame 23 to swing over into record discharging position. A pair of detent levers 118 and 119 are pivoted at their rear ends and their lower edges rest upon a transverse pin 120 carried by the lever 110. The detent lever 118 is provided with a notch 121 adjacent its outer end and when the end of the pin 120 occupies that notch the lever 110 is held in such position that the motor is caused to rotate in a direction to bring the turntable to a playing position through the swinging movement of the frame 23. The lever 119 is provided with a detent notch 122 and when the end of the pin 120 occupies that notch, the lever 110 is in neutral or upright position and the motor 88 is stopped. The lower end of a link 123 is pivotally and slidably connected at 124 to the detent lever 118 and the upper end of this link is pivotally connected at 125 to a rocking bar 126, the latter being pivoted intermediate its ends at 127. The upper end of a link 128 is pivotally connected at 129 to the rocking bar and the lower end of this link or rod 128 has yielding connection by means of a spring 130 and washer 131 with a laterally extending slotted bracket 132 carried by the detent lever 119. Thus downward movement of the rod 128 places a tension on the lever 119 and tends to hold its lower edge into engagement with the pin 120. A collar 133 on the lower end of the rod 128 lifts the lever 119 to release the lever 110 upon upward movement of the rod 128, as hereinafter described. A shaft 134, see Fig. 3, is journaled in bearings 135 and carries at its end adjacent the partition 9 a crank arm 136 having a roller 137 adjacent its outer end which bears upon the upper edge of the rocking bar 126. When the crank arm 136 is given downward movement it rocks said rocking bar upon its pivot 127 to depress its right-hand end until said right-hand end is engaged by a detent latch 138 which is actuated by a detent magnet 139, when the proper circuit is completed, as hereinafter set forth. In other words the movement of the shaft 134 affects a setting of the rock bar 126, which setting of the bar is maintained by the detent latch 138 until the magnet 139 is energized. A crank arm 140 upon the shaft 134 carries an L shaped link at its free end and the free end of the arm 65 swings over the horizontal portion 141 of said link when the table is moved to playing position, so that upon downward movement of the arm 65, the arm 140 will be depressed and the shaft 134 will be rocked to effect the setting of the rock bar, as described. At the same time the finger 78 moves into position to engage the horizontal foot 149 of a lever 150 which is pivoted intermediate its ends at 151 to a bracket carried by the under side of the horizontal partition 6. The opposite end of the lever 150 engages and actuates a detent latch 152 which is pivoted at 153 to a bracket 154 which likewise depends from the under side of the horizontal partition 6. A spring 155 is connected to the tubular portion of the tone arm at 156 and to the partition 9 at 157 and said spring tends to swing the tone arm to a position for beginning the playing of the record. This tubular portion of the tone arm carries an arm 158 which is adapted to be moved into engagement with the detent latch 152 by a pin 159 on the free end of a lever 160. The lever 160 is pivoted at 161 and is pivotally connected at 162 to a link 163. The link 163 in turn is pivotally connected at 164 to an arm 165 which is fast upon the vertical shaft 24. As the frame 23 moves to record discharging position, the arm 165 moving with the vertical shaft 24 pulls upon the link 163 and swings the lever 160 and pin 159 toward the right in Fig. 3. This acts against the arm 158 and moves the free end of said arm to the position illustrated in Fig. 3 where it is engaged and restrained by the latch 152. In other words as the frame 23 and the turntable move to record discharging position, beneath the magazine 19, the tone arm and sound box are moved toward the right in Fig. 3 so that they will be out of the way when the table returns to playing position and the record carrier 38 acts to deposit the record upon said turntable. A tubular element 166 constituting a weight encircles and is slidably mounted upon the tubular portion of the tone arm and this weight carries a projection 167 which overlies the free end of the rock bar 126, so that as said rock bar is set under the action of shaft 134 the weight is lifted and is held in elevated position until the magnet 139 is energized and the rock bar is released. This tubular weight 166 carries a foot 168 which overlies and is adapted to act upon the rear end of a lever 169. A piston 170 and cylinder 171 constitute a dash pot for cushioning and retarding the movement of the lever. A spring 172 tends to elevate the rear end of the lever 169. A second lever 173 lies in the rear of the lever 169 and the lever 173 is connected to and moves with the tubular member 15 of the sound box. Thus the sound box is capable of vertical movement upon its pivotal connection with the tone arm but is restrained by the arm 169 due to the presence of a pin or other projection 174 carried by the arm 169 and overlying the upper edge of the arm 173. Thus when the arm 169 is depressed by the foot 168 under the action of the weight 166, the sound box will be held in elevated position with respect to the tone arm and when the weight 166 is raised, the spring 172 will act (though very gradually because of the dash pot) to raise the lever 169 and to permit the sound box to descend, to bring the needle into contact with the record. The vertical portion of the tone arm carries a laterally extending arm 175 and this arm carries a contact finger 176 that is adapted to make contact with an adjustable screw 177 supported upon the sidewall of the casing. The electric wiring has been omitted in the mechanical figures of the drawing in order to prevent confusion. The wiring is clearly shown in the diagrammatic Fig. 12 and the location and control of the various circuit will be hereinafter specifically described. The pivot 161 of lever 160 extends through the partition 6 into the upper compartment 7 and there carries a transverse arm 178 which is adapted to engage in a notch 179 formed in the under side of a lever 180 the rear end of said lever being pivoted at 181 to a bell crank lever 182. A spring 183 tends to swing the lower arm of said bell crank lever to the left in Fig. 1 and to bring a pin 184, carried by said lever, into engagement with the electric contact strips 185 to thereby complete an electric circuit, as hereinafter set forth. A magnet 186 acts when energized to lift the lever 180 to free the notch 179 of the arm 178 and when this is done the spring 183 will act to close the circuit to the contact fingers 185. The lifting of the lever 180 to permit the spring 183 to act to close the circuit may be effected independently of the magnet 186 by the provision of a turnable rod 187 having a knob 188 upon its outer end and having a crank arm 189 at its inner end which underlies the lever 180. It is manifest that a partial turn of the rod 187 will through the crank arm 189 act to lift the lever 180 so that it may move to close the circuit through the contacts 185.

The invention contemplates rendering the mechanism operable by the deposit of a coin and to this end a coin chute 190 is provided and electrical connections hereinafter described are provided whereby when a coin is deposited in the coin chute a circuit is completed between the sides of the chute and a contact spring 191, see Fig. 1, to set the machine in operation.

It is further intended, when the machine is used in public places as a coin controlled apparatus, to provide a light 192ª in the compartment 8 and to provide doors having transparent panes 8ª through which the mechanism is visible during the operation of the machine as long as the light 192ª is lighted.

The operation of the machine as far as described is as follows: Assuming that there is a record on the turntable 18 and that the machine is playing, the tone arm will follow the grooves of the record in the usual manner and at completion of the playing of the selection upon the record the contact finger 176 will make contact with the screw 177 and a circuit will be completed to energize magnet 139, one side of this magnet being connected to the main line conductor 82, the circuit being completed to the other main line conductor 193 through a conductor 194, a shiftable contact arm 195, contact point 196, conductor 197, conductor 198, contact strip 176, screw 177 and conductors 199 and 200. This energizes the magnet 139, as stated, and operates the latch 138 to release rock bar 126, permitting the weight 166 to drop and acting through foot 168, lever 169, pin 174 and lever 173 to raise the sound box to lift the needle from the record. Since the rod 128 is pivoted to the rock bar at that side of its pivot opposite its engagement with the weight, it follows that the descent of the weight will raise the end of the rock bar to which the rod 128 is connected and this will through the nut 133 acting upon the under side of the bracket 132 lift the detent lever 119 and free the pin 120 of its engagement with the notch 122. The spring 116 thereupon acts to pull the reverse lever 110 as far rearwardly as possible and this sets motor 88 into operation to cause the frame 23 to swing the turntable and the record carried thereby over beneath the magazine. During this movement of the turntable to position beneath the magazine, the lever 160 and parts associated therewith act as hereinbefore described to swing the arm 158 and the tone arm toward the right in Fig. 3, the arm 158 being locked in that position by the latch 152 and the sound box being still held in elevated position. As the tone arm moves over toward the right in the manner described, the extremity 201 of a bracket 202 that is carried by the arm 169 rides beneath a fixed bracket 203 and thus as long as the tone arm is in its extreme position toward the right in Fig. 3, the arm 169 will be held in its depressed position and the sound box will be held in its raised position, even though the weight 166 be raised. When the turntable 18 reaches a position where it is concentric with and beneath the magazine 19, the discharge and pick up motor 33 is energized due to the fact that the contact finger 106 moves into engagement with the contact strip 101 on block 97. This circuit is completed as follows: from the main line conductor 192 through conductor 205 to one side of the motor 33 and from the other side of the motor through a conductor 206, contact strip 106, contact strip 101, conductor 207, conductor 197, contact 196, contact arm 195 and conductor 194 back to the other main line conductor 193. This results in the motor 33 causing the disc 43 to make one complete revolution. The reason that the disk does not continue to revolve is due to the fact that in its first revolution the cam 44 permits the closing of the circuit through finger 46 and contact screw 47. This breaks the circuit to the motor 33 by energizing a coil 208 of a solenoid magnet, the circuit to said coil being completed as follows: from main line conductor 193, conductor 209, screw 47, spring 46, conductor 210, contact strip 105, contact strip 100, conductor 211, coil 208, and conductors 212 and 213, back to the other main line conductor 192. The energizing of the coil 208 draws the core 214 thereof toward the left (see Fig. 12), and moves the contact arm from contact point 196 over onto a contact point 215. Since a part of the circuit of motor 33 was through contact point 196, it follows that this results in bringing the motor to a stop after the disk has made one complete revolution. When the disk made its complete revolution, it acted through the connections previously described, to force the turntable 18 upwardly and to force the record gripping mechanism 34 downwardly. The upward movement of the turntable forced the record carried thereby upwardly against the underside of the pile of records in the magazine 19, carrying the disk upon the turntable upwardly far enough so that its edges would pass above spring-actuated detents 216 disposed at intervals around the wall of the magazine 19. At the same time, the hooked ends 74 of the strip 73 were caused to engage the uppermost record. When the table descended it left the record that it had previously carried within the magazine and beneath the pile of records in said magazine, and when the record carrier 38 ascended it carried with it the uppermost record.

The actuation of the bell crank lever 53 also caused its roller to engage the crank arm 114 (see Fig. 4), and throw said arm downwardly. This resulted in a turning of the shaft 113 and this in turn (see Fig. 1), resulted in swinging the arm 110 as far forwardly as possible, thereby setting the transfer motor in operation to cause the frame 23 and table 18 to swing back to playing position. During the travel of the table to playing position the record is held in an elevated position and out of contact with the table by the carrier 34 and when the table reaches playing position, the motor 33 is again energized and causes the disk to make one complete revolution, thereby causing the turntable to rise to meet the record and causing the record carrier to descend toward the table so that by the time the strip 73 is flattened enough to cause the release of the record, the record and table are but slightly separated and the record is dropped gently and without danger of breakage upon the table. The completion of the circuit to the motor 33 at this time to cause the revolution of the disk as aforesaid, is effected as follows: From main line conductor 192, conductor 205, motor 33, conductor 206, contact 106, contact 103, conductor 217, conductor 218, contact point 215, arm 195, and conductor 194, back to the other main line conductor 193. However, the circuit to this motor is broken after making a single revolution by the cam 44 completing a circuit through finger 46 and screw 47, as follows: From main line conductor 193 conductor 209, screw 47, spring 46, conductor 210, contact strip 105, contact strip 102, conductor 219, conductor 220, magnet 221, conductor 222, and conductor 213, back to the main line conductor 192. The energizing of the magnet 221 again pulls the core 214 over toward the right to restore arm 195 to contact 196 to remove the said arm from contact 215 which, up to this time, had constituted a part of the circuit of the motor. When the table moved to playing position, as described, the contact strip 108 came into engagement with the contact strip 104, and this would have effected the starting of the playing motor except for the fact that the circuit to said motor is not completed until the magnet 221 is energized, as just set forth, to restore the arm 195 to the contact 196. The circuit to the playing motor being completed after this is done, as follows: from the main line conductor 192, through conductor 223, contact 104, contact 108, conductor 225, motor 27, conductor 226, contact 101, conductor 207, conductor 197, contact 196, arm 195, and conductor 194, back to the other main line conductor 193. Thus it will be seen that the operation of placing the record upon the turntable is completed before the playing motor is permitted to start.

Figure 11:
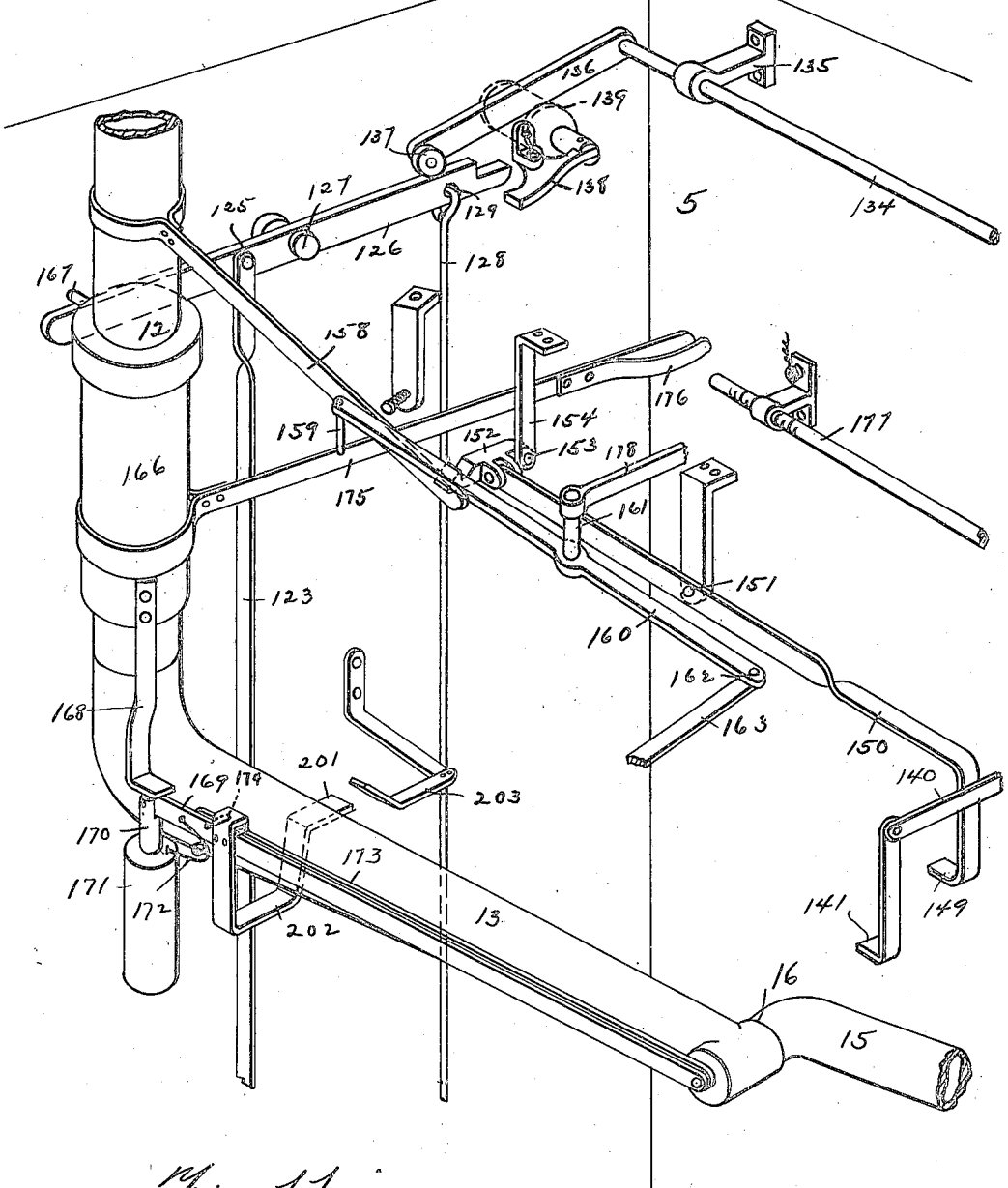
Fig. 11 is a perspective view of a part of the tone arm and adjacent parts.

When the record carrier 34 moved downwardly to place the record carrier on the turntable, its arm 65 engaged the foot 147 of the arm 140, (see Figs. 1, 3 and 11.) This resulted in rocking the shaft 134, thereby lifting the weight 166 and re-setting the rock bar 126, said rock bar being again engaged by the latch 138 to hold the weight in elevated position. However, this elevation of the weight does not result in immediately permitting the sound box to swing downwardly because of the engagement of the extremity 201 of the bracket 202 beneath the fixed bracket 203. Upon the contrary, the sound box remains in its elevated position until during the return or upward movement of the lever 65 the finger 78 which yielded upon the downward movement of arm 65 engages the underside or horizontal portion 149 of the down-turned end of the lever 150, thereby rocking said lever upon its pivot to actuate the latch to release the arm 158. When this is done, the spring 155 acts to swing the tone arm and sound box to the left in Fig. 3 and above the record. When the extremity of the bracket 202 moves from beneath the fixed bracket 203 the arm 169 is permitted to rise under the influence of spring 172 and this, in turn permits the sound box to descend to bring the needle into engagement with the record. This completes the cycle of operation.

The invention contemplates the provision of a bodily removable magazine 19 so that one filled magazine may be slipped out of place and another substituted therefor at will. To this end the side wall of the case 5 is provided with an opening 5$^a$, and the magazine 19 is provided with blocks 19$^a$ having ribs 19$^b$ which slide in grooves 19$^c$, on fixed guideways 19$^d$. In other words, the magazine as a whole slides into place much after the manner of a drawer. By the provision of switches 227 and 228 in the circuits of the motors 33 and 88, these motors may be cut out of action to permit the operation of the phonograph in the usual way, i. e., by the placement of the records upon the table by hand.

If the machine starts to play a record which is displeasing to the hearer and he desires to substitute another record therefor, he can accomplish this result by pressing a push button 229, which closes a circuit to the magnet 139, the circuit to this magnet is completed as follows: From main line conductor 192, through conductor 230, through magnet 139, conductor 200, conductor 231, and push button 229, conductor 232, conductor 197, arm 195 and conductor 194, back to the other main line conductor 193. This has the same result as though the machine had completed the playing of a record and had effected the energization of magnet 139 in the normal inward swinging movement of the tone arm. When it is desired to control the machine by means of a coin, the lever 180 is permitted to rest upon the swinging arm 178, the machine would continue the operation indefinitely if it were not for the fact that the circuit is interrupted through one of the main line conductors 193 when the bridging element 184 is forced away from the contacts 185 It follows, therefore, that it is only necessary to bridge these contacts to again complete the circuit through 193 and permit the machine to resume its operation. When a coin, indicated at 233, is deposited in the coin chute and establishes communication between spring finger 191 and the wall 190 of the chute, a circuit is completed from main line 192 through conductor 234, spring finger 191, coin 233, chute wall 190, conductor 235, magnet 186, conductor 236, back to the line 193. This energizes the magnet and lifts the lever 180 out of engagement with arm 178 so that the spring 183 may act to bring the bridging element into engagement with the contact points 185, whereupon the machine resumes its operation. The light 192$^a$ which illuminates the compartment containing the mechanism, is visible, when illuminated, through the transparent doors 8$^a$. The cabinet is lighted only when the coin is deposited, and goes out when the mechanism ceases to operate. This is effected by connecting one side of said lamp to a contact point 264 by a conductor 265, and the other side of said lamp to the main line conductor 192 by a conductor 266. Another contact point 267 adapted to be brought into bridging engagement with point 264 is connected by a conductor 268 with the line 193 and thus when the contact points 185 are bridged the points 264 and 267 are likewise, but independently, bridged, it being understood that the contact points on the bridging element 184 which engage points 264 and 267 are in electrical communication with each other but are insulated from the remainder of the bridging elements. If it be desired to effect the control of the mechanism from a distant point, such, for example, as from the dining room or from some other room of the house, this may be effected by connecting one side of a push button 268 by a conductor 269 with the tongue 191, and connecting the other side of said push button by a conductor 270 with the chute wall 190. The closing of the push button has the same effect as the deposit of a coin.

It is to be understood that the invention is not limited to the precise construction set forth, for it is manifest that the principles involved may be embodied in mechanisms varying in many respects from those shown. The invention includes within its purview whatever changes fairly come within either the terms or the spirit of the appended claims.

Having described my invention, what I claim is:

1. A device of the character described, comprising a traveling rotative turntable, a record receiving magazine, means for supporting a plurality of records therein, a record gripping and carrying element bodily movable with the table, said table being movable to a position beneath the magazine and the gripping element being movable to a position above the magazine, and means for effecting movement of the table upwardly into the magazine to deposit a record beneath the pile therein, and means for effecting movement of the record gripping device downwardly into the magazine to engage the uppermost record therein.

2. A structure as recited in claim 1 in combination with a tone arm, a transfer motor controlled by the movement of said tone arm and connections between the transfer motor and the traveling turntable to impart traveling movement to said turntable to transfer said turntable from playing position to a position beneath the magazine.

3. In a device of the character described, comprising a movable frame, a record magazine having an open top and bottom means for supporting a plurality of records therein, a rotative turntable on the movable frame, a record gripping device on the movable frame, means operative upon the completion of the playing of a record for setting said frame into operation to move the turntable beneath the magazine and the gripping device above said magazine, and means operating to force the table upwardly into the magazine and to move the gripping device downwardly into the magazine upon the completion of the movement of said frame to said position.

4. A structure as recited in claim 3 wherein said magazine is provided with a plurality of yieldable detents past which the record is forced during the upward movement of the table.

5. In an automatic record transferring mechanism for phonographs the combination with a phonograph cabinet of a record magazine and means for mounting said magazine for bodily movement into and out of said cabinet.

6. In an automatic record transferring mechanism for phonographs the combination with a record magazine, of means for mounting said magazine in operative position in the path of movement of a record gripping element, said means being of a nature to permit the bodily removal of one magazine and the bodily substitution of another magazine therefor.

7. In an automatic record transferring mechanism for phonographs the combination with a ring like magazine for records which is open top and bottom, of means for mounting said magazine for bodily sliding movement into operative position between a turntable and a record gripping element.

8. In an automatic record transferring mechanism for phonographs, a ring-like magazine for records which is open top and bottom, yieldable detents disposed at the lower edge of said magazine which yield to permit the passage of records upwardly thereby into said magazine but prevent downward movement of said records and means for mounting said magazine for bodily sliding movement into operative position between a turntable and a record gripping element.

9. A structure as recited in claim 3 in combination with a yieldingly mounted bearing for the shaft of said disc.

10. A machine of the character described comprising a bodily moving frame, a turntable mounted for rotation thereon, a playing motor mounted upon and bodily movable with the frame, connections between the playing motor and the turntable, a discharge and pick-up motor mounted upon and bodily movable with the frame, a record gripping device, means actuated by the discharge and pick-up motor for imparting bodily upward movement to the turntable and bodily downward movement to the gripping device, and means for imparting limited movement to said motor when the turntable and gripping device reach a position of alinement with the magazine.

11. A device of the character described comprising a bodily movable frame, a turntable mounted for rotation thereon, a playing motor mounted upon and bodily movable with the frame, connections between the playing motor and the turntable, a discharge and pick-up motor mounted upon and bodily movable with the frame, a record gripping device, means comprising a rotative element actuated by the discharge and pick-up motor for imparting bodily upward movement to the turntable and bodily downward movement to the gripping device, and means for energizing said motor long enough to impart a single rotation to said rotative element when the turntable and gripping device reach a position of alinement with the magazine.

12. A structure as recited in claim 11 in combination with means for again imparting a single rotation to said rotative element when the turntable reaches playing position.

13. In a device of the character described, a movable frame, a record magazine having an open top and bottom, means for supporting a plurality of records therein, a rotative turntable on the movable frame, a record gripping device on the movable frame, a screw, a nut on the screw having engagement with the movable frame, a reversible motor for operating the screw in both directions, a tone arm and a circuit closing element for said motor on the tone arm for setting said motor into operation when the tone arm completes its movement during playing.

14. A structure as recited in claim 9 in combination with a motor mounted upon and movable with the movable frame, connections between said motor and turntable for imparting upward movement to the turntable to force the record carried thereby into the magazine when the table reaches a position of alinement with said magazine and means for reversing the transfer motor at the completion of movement of the table into and out of the magazine.

15. A device of the character described comprising a frame mounted to swing about a center, a rotative record table carried by said frame, a record magazine disposed in operative relation to the swinging frame at one of the limits of movement of the latter, means operative when the frame reaches the latter movement for effecting the discharge of a record from said table into said magazine, a record gripping device carried by the movable frame, means for effecting movement of the record gripping device to cause it to engage a record when the frame is in operative relation to the magazine, means for effecting swinging movement of the frame to swing it from the last named position to playing position, means for effecting a delivery of the record from the gripping means to the table upon the completion of movement of the table to playing position, a tone arm and sound box movable to and from playing position and means operating to move the sound box to playing position and to bring the needle into engagement with a record on the record table upon the completion of the movement of the table to playing position.

16. A device of the character described comprising a swinging frame, a rotative turntable mounted upon and bodily movable with the swinging frame, an actuating mechanism for imparting a bodily up and down movement to the table, a discharge and pick-up motor carried by the frame for actuating said mechanism, a playing motor mounted upon the frame, means for imparting rotation to the table from said playing motor, a record gripping device upon the frame, means actuated by the discharge and pick-up motor for effecting movement of the record gripping device, a transfer motor, driving connections between the transfer motor and the swinging frame for swinging said frame back and forth, a record magazine beneath which the rotative table moves when the swinging frame is moved to record discharging position, a tone arm, a sound box carried by said tone arm, means operative upon movement of the swinging frame to record discharging position for moving the tone arm away from playing position, a detent for holding the tone arm in the last named position, means for energizing the discharge and pick-up motor to force the table upwardly into the magazine to deposit a record therein and for moving the pick-up mechanism to cause it to grasp a record upon completion of movement of the swinging frame to record discharging position, means for again energizing said motor upon completion of the movement of the swinging frame to playing position to advance the table toward the pick-up device and to move the pick-up device toward the table to cause it to deposit a record thereon, means carried by the pick-up device for effecting a release of the detent to permit movement of the tone arm to playing position and circuit completing means carried by the tone arm and effective when the tone arm finishes the playing movement to complete a circuit to a magnet and means effective when said magnet is energized for setting the transfer motor in operation to swing the swinging frame to record discharging position.

17. In combination a frame mounted to swing about a vertical axis, a shaft mounted in said frame, a horizontal turntable upon said shaft, a motor mounted upon and bodily movable with the frame and a mechanism driven by the motor and connected to the shaft of the turntable for imparting bodily vertical movement to the shaft with respect to the frame.

18. A structure as recited in claim 17 in combination with a circuit in which said motor is included and a limit switch included in said mechanism for bringing said mechanism to a stop after it has moved the table upwardly and downwardly.

19. A frame mounted to swing about a vertical axis, a turntable mounted thereon, a motor mounted upon and carried by the frame and a driving connection between said table and said motor.

20. A frame mounted to swing about a vertical axis, a turntable mounted for rotation on said frame, a friction disc engaging the under side of said table, a playing motor and a flexible driving connection between the playing motor and said friction disc.

21. A frame mounted to swing about a vertical axis, a shaft mounted for vertical movement in said frame, a turntable carried by said shaft, a swinging lever, means interposed between said swinging lever and said shaft for imparting movement to said shaft from said lever, a rotative disc, connections between said disc and the swinging lever whereby rotation of the disc imparts movement to the lever, a motor mounted upon and movable with the frame, a reducing gearing between the motor and the disc, a circuit in which the motor is included and means for breaking said circuit after the disc has made one complete revolution.

22. A frame mounted to swing about a vertical axis, a turntable carried thereby, a screw, a nut upon said screw, a link having pivotal engagement with the frame and sliding engagement with said nut and a spring connection between the link and the frame.

23. The combination with a swinging frame mounted to swing about a vertical axis, a turntable thereon, a playing motor thereon, connections between the playing motor and the turntable, a discharge and pick-up motor on the frame, a vertically movable shaft by which the turntable is carried, connections actuated by the discharge and pick-up motor for imparting vertical movement to the shaft with respect to the frame, electric circuits in which the playing motor and the discharge and pick-up motor are included and contact members bodily movable with the frame and operating to complete a circuit to the playing motor at the limit of travel of the swinging frame to playing position and to complete a circuit to the discharge and pick-up motor at each of the limits of travel of the frame.

24. A structure as recited in claim 23 in combination with a circuit interrupting means operable by the discharge and pick-up motor and acting to interrupt the circuit to said motor after the same has made a limited movement.

25. A pick-up mechanism for records comprising a vertically movable stem, a bowed spring strip having hooks at its outer end, said stem being engaged with the central portion of said strip and means for supporting said strip upon opposite sides of its center and between the point of engagement of the stem therewith and the outer ends of said strip.

26. A pick-up mechanism for records comprising a vertically movable stem, a yoke through which this said stem moves, said yoke having loops at its opposite end and a spring strip passing through said loops the stem being engaged with said strip at the central portion thereof, said strip having hooks upon its end.

27. A pick-up mechanism for records comprising in combination with a horizontally swinging frame, a vertically swinging lever, a stem engaged with said lever and movable downwardly when said lever is swung downwardly, said stem being slidably mounted in a part of said frame, a yoke through which said stem passes, said yoke having loops at its outer end, a bowed spring strip passing through said loops the stem being engaged with said strip at its central portion and the outer end of the spring strip having hooked terminals.

28. A structure as recited in claim 27 in combination with a discharge and pick-up motor, a turntable movable toward and from the spring strip, connections between the motor and the turntable for imparting movement upwardly and downwardly to the turntable and means for simultaneously imparting movement to the swinging lever to actuate the gripping mechanism.

29. A device of the character described comprising a swingingly mounted tone arm, a sound box pivotally connected to the tone arm, a table swinging in a horizontal plane from playing position to record engaging position and back to playing position, means for moving the tone arm to playing position, means for moving the tone arm away from playing position, means for holding the sound box in elevated position with respect to the tone arm when moved away from playing position and means effective upon the return of the table to playing position to effect the return of the tone arm to playing position and to release the sound box to permit it to move to record engaging position.

30. The combination with a swingingly mounted tone arm, a sound box pivotally connected thereto, a weighted element upon the tone arm, a connection between the sound box and the weighted element whereby when the weight is in lowered position it holds the sound box in elevated position by engaging said connection, a table mounted for bodily swinging movement, a frame by which said table is carried, connections between the frame and the tone arm for swinging the tone arm out of playing position as the table is moved to record discharging position, a detent for holding the tone arm in the last named position and means acting when the table has returned to playing position for releasing said detent to permit the tone arm to return to playing position.

31. The combination with a frame mounted to swing about a vertical axis from playing to record discharging position, a record gripping device carried by said frame, a playing motor carried by the frame, driving connections between the playing motor and a rotative turntable mounted upon said frame, a discharge and pick-up motor mounted upon the frame, driving connections between the discharge and pick-up motor and the turntable for moving the turntable bodily to effect the discharge of the record therefrom when said turntable reaches record discharging position, a pick-up mechanism carried by the frame likewise actuated by said motor, a transfer motor for imparting back and forth swinging movement to the frame, electric circuits for the several motors including fixed contact elements and movable contact elements upon the swinging frame and making contact with the fixed contact elements at each of the limits of travel of the movable frame to complete the circuit to the playing motor and to the discharge and pick-up motor.

32. A mechanism as recited in claim 31 in combination with a transfer motor and means movable when the playing of a record has been completed to set said transfer motor in operation and connections between said motor and the frame then operative to move the frame to record discharging position.

33. A device of the character described comprising a rotative and bodily movable table, a swinging frame by which said table is carried, a transfer motor for effecting the swinging movement of said frame, means for controlling said motor including an electrically actuated element, means for energizing said electrically actuated element at the completion of movement of the tone arm after playing.

34. A structure as recited in claim 33 in combination with means for energizing said electrically actuated element independently of the movement of the tone arm and manually to thereby interrupt the playing of a record at any point in the travel of the tone arm.

In testimony whereof I hereunto affix my signature.

GEORGE A. BEHLEN.